US012769590B2

(12) United States Patent
Bandeira et al.

(10) Patent No.: US 12,769,590 B2
(45) Date of Patent: Oct. 20, 2026

(54) NETWORK SYSTEM USING FOG COMPUTING

(71) Applicant: SCHREDER ILUMINAÇAO SA, Carnaxide (PT)

(72) Inventors: Lourenço Bandeira, Carnaxide (PT); André Glória, Carnaxide (PT); Michael Steurer, Carnaxide (PT)

(73) Assignee: SCHREDER ILUMINAÇAO SA, Carnaxide (PT)

( * ) Notice: Subject to any disclaimer, the term of this patent is extended or adjusted under 35 U.S.C. 154(b) by 590 days.

(21) Appl. No.: 18/256,274

(22) PCT Filed: Dec. 7, 2021

(86) PCT No.: PCT/EP2021/084631
§ 371 (c)(1),
(2) Date: Jun. 7, 2023

(87) PCT Pub. No.: WO2022/122750
PCT Pub. Date: Jun. 16, 2022

(65) Prior Publication Data
US 2024/0078138 A1 Mar. 7, 2024

(30) Foreign Application Priority Data
Dec. 7, 2020 (NL) ...................................... 2027061

(51) Int. Cl.
*G06F 9/50* (2006.01)

(52) U.S. Cl.
CPC .................................. *G06F 9/5072* (2013.01)

(58) Field of Classification Search
CPC ..................................................... G06F 9/5072
See application file for complete search history.

(56) References Cited

U.S. PATENT DOCUMENTS

2018/0270121 A1* 9/2018 Stringfellow ....... H04L 41/0816
2018/0285767 A1* 10/2018 Chew .................... G06N 20/00
(Continued)

FOREIGN PATENT DOCUMENTS

GB 2578746 A 5/2020

OTHER PUBLICATIONS

PCT International Search Report and Written Opinion, Application No. PCT/EP2021/084631, mailed Mar. 29, 2022, 15 pages.

*Primary Examiner* — Sisley N Kim
(74) *Attorney, Agent, or Firm* — McDonnell Boehnen Hulbert & Berghoff LLP

(57) ABSTRACT

Example embodiments relate to a network system including a plurality of edge devices, an edge device thereof including at least one data source configured to obtain environmental data related to an event in the edge device or its vicinity, an edge processing means configured to produce edge processed data comprising at least one value representative for a class selected for classifying the event, and an edge communication means; a plurality of fog devices, a fog device thereof being associated with a subset of said plurality of edge devices and comprising a fog communication means, a fog processing means configured to process the edge processed data and to produce fog processed data, and a central control system in communication with said plurality of fog devices and configured to receive fog processed data from said plurality of fog devices.

19 Claims, 9 Drawing Sheets

(56) References Cited

U.S. PATENT DOCUMENTS

| | | | | |
|---|---|---|---|---|
| 2019/0325060 | A1* | 10/2019 | Fenoglio | G06F 16/906 |
| 2020/0137420 | A1 | 4/2020 | Natanzon et al. | |
| 2020/0357276 | A1 | 11/2020 | Yang et al. | |
| 2023/0169356 | A1* | 6/2023 | Banerjee | G06N 20/20<br>706/12 |
| 2023/0254365 | A1* | 8/2023 | Matsuo | H04L 67/1008<br>709/224 |

* cited by examiner

NETWORK SYSTEM USING FOG COMPUTING

CROSS-REFERENCE TO RELATED APPLICATIONS

The present application is a national stage entry of PCT/EP2021/084631 filed Dec. 7, 2021, which claims priority to NL 2027061 filed Dec. 7, 2020, the contents of each of which are hereby incorporated by reference.

FIELD OF INVENTION

The present invention relates to a network system, in particular a smart-city network system, comprising edge devices, fog devices and a central control system.

BACKGROUND

A city's task in providing quality public space for its citizens lies not only in reserving sufficient areas but also in ensuring that the conditions, such as maintenance and management, enable it to be used to its full potential. This introduces additional concerns about the quality of the public space, ensuring safety of use, and its accessibility to all user groups as well as the financial burden incurred by the creation and maintenance of public spaces.

To address those challenges cities will increasingly apply new technologies and innovation across a wide range of sectors, from transport and mobility to citizen engagement. In particular, Information and Communication Technologies (ICT) are used increasingly to solve existing and rising challenges within cities. So-called digital cities or smart-cities emerge, producing a lot of data, such that controlling the data volume, assuring security and privacy and future scalability of such systems are essential.

It is common practice today to use Cloud computing architecture approaches between sensors and actors deployed in smart cities, limiting the free flow of information between devices due to the centralistic nature of the architecture. To unlock the potential of the generated data, new architectures are discussed in literature. One approach to address the explosion of the Internet of Things (IoT) and the ability to collect, analyze and provide big data in the cloud is edge computing; a new computing paradigm in which data is processed at the edges, i.e. at the sensor's level.

Edge Computing refers to the approach to push the process of knowledge discovery from the cloud further towards the connected end devices, also called IoT devices or edge devices. Edge computing provides shorter response times, reduces bandwidth costs, and increases data safety and privacy protection when compared to cloud computing.

In contrast to a cloud environment with its nearly unlimited resources, the available computational resources on the edge are restricted due to limited processing capabilities, storage limitations and energy constrains. As a consequence, a trade-off between processing costs to extract the knowledge on the edge and network costs to transfer the raw data to the cloud need to be found.

Taking all of the above into consideration, a new architecture addressing the Internet of Things challenges in an efficient way is needed.

WO2020/161311 A1 in the name of the applicant, which is included herein by reference, describes a luminaire network system capable of transmitting local data available in a luminaire in a more efficient way. Although this solution already contributes to a more efficient transmission of data, further improvements may be made.

WO2019175435A2 in the name of the applicant, which is included herein by reference, describes a luminaire network wherein the processing unit of the luminaire is configured to process the first sensed data to produce first processed data; and wherein the luminaire network is further configured such that the first processed data of at least two luminaires is further processed to produce second processed data. Also this solution already contributes to a more efficient transmission of data, but further improvements may be made.

SUMMARY

The object of the invention is to provide a network system, in particular for a smart-city, providing reliability in communications given the existing constrains in terms of latency, network bandwidth and local edge resources.

According to a first aspect of the invention, there is provided a network system comprising a plurality of edge devices, a plurality of fog devices and a central control system. The plurality of edge devices is arranged at a plurality of locations. An edge device thereof comprises at least one data source, such as a sensor, an edge processing means, and an edge communication means. The at least one data source is configured to obtain environmental data, said environmental data being related to an event in the vicinity of the edge device or in the edge device. The edge processing means is configured to produce edge processed data based on said environmental data. The edge processed data may comprise at least one value representative for a class selected from a plurality of predetermined classes for classifying the event. The edge communication means is configured for communicating edge processed data. A fog device of the plurality of fog devices is associated with a subset of the plurality of edge devices. The fog device comprises a fog communication means and a fog processing means. The fog communication means is configured to receive edge processed data from said subset and to transmit fog processed data. The fog processing means is configured to process the edge processed data received from said subset and to produce fog processed data based thereon. The fog processed data may comprise information about an event in the vicinity of the subset or an event in at least one edge device of the subset. The central control system is in communication with the plurality of fog devices and configured to receive fog processed data from said plurality of fog devices.

In this way, the network system using fog devices and some preprocessing in the edge devices provides a good trade off between pure edge computing and computing in the central control system, typically the cloud. More in particular, by determining a value representative for a class of an event in the edge device or in the vicinity of the edge device, the obtained environmental data can be transmitted in a more compact and sustainable manner to the associated fog device. Also, because the fog device obtains edge processed data from a subset of edge devices, it can produce fog processed data about an event in the vicinity of the subset, where possibly more than one edge device has classified that event and transmitted edge processed data about that event to the fog device. In that manner, the fog device is capable of generating fog processed data about the event which is more accurate and/or more compact and/or more complete than the sum of the edge processed data received from the subset. In other words, the solution fog/edge computing can bridge the gap between the central control system and the data sources of the edge devices by suitably organizing computing, storage, networking, and data management between the edges devices, the fog devices and the central control system. The benefit of this solution is that the environmental data can be processed partially locally in the edge devices and partially regionally in the fog devices, reducing the amount of data that has to be transmitted to the central control system, the amount of processing in the central control system and thus the latency for processing the data. Also, privacy related data may be processed locally or regionally, wherein a decision may be taken locally or regionally as to whether that data should be sent to the central control system, typically the cloud. In this way privacy is insured and sustainable data is processed by design. Thus, this architecture favors data minimization and data protection since only selected parts of the data will travel in selected parts of the upward edge-fog-cloud chain.

According to a preferred embodiment, the fog communication means is configured to receive first edge processed data about an event from a first edge device and to receive second edge processed data about an event from a second edge device. The fog processing means is configured to process the first and second edge processed data to determine whether or not the first and second edge processed data relate to the same event, and, optionally, to transmit fog processed data to the central control system in accordance with the determined result. In this way, the fog device is capable of correlating edge processed data coming from two edge devices and can generate thus fog processed data which is more accurate and/or more compact by combining data from different edge devices that have obtained data about the same event. In this manner traffic between the fog device and the central control system may be reduced, reducing in turn computation effort in the central control system, e.g. the cloud, and providing thus further swiftness to the system.

According to a preferred embodiment, the edge processed data comprises at least one value representative for an attribute associated to the event, said attribute characterizing a property of the event. In this way, more data content can be achieved for applications where classes and attributes may both be needed. In particular, the following sets of classes and attributes may be used for the following events/objects involved in events:

- for vehicles, classification may be by type of vehicle (car, truck, motorcycle, bicycle), size of vehicle (big, small, intermediate), model of vehicle, color of vehicle; and a corresponding set of attributes may be number plate, speed, direction, number of occupants;
- for animals, classification may be by type of animal; leashed or not; normal/violent behavior
- for persons, classification may be by type of individual whether civil/military/policeman/first responder; normal/violent behavior, moving/static, wearing a mask/not wearing a mask; and a corresponding set of attributes may be speed, direction, number of people;
- for buildings, classification may be by type of building; an attribute may be the location;
- for street furniture, classification may be by type, status; an attribute may be the location;
- for a driver for driving a light source of a luminaire, classification may be by status (normal/abnormal behavior), an attribute may be the power consumption value;
- for a trash bin, a traffic light, a charging station, a parking station, classification may be by status (full/not full, available/unavailable, operational/out of order), an attribute may be the location
- for a street or pavement surface, classification may be according to status (dry/wet), an attribute may be the amount of humidity, the location;
- for a visibility condition, classification may be good/bad visibility;
- for a noise, classification may be by noise level above a threshold, attributes may be frequency, level, duration of the noise;
- for a change in the weather, classification may be by type of weather (fog, sun, rain, wind); attributes may be the amount of rain, humidity level, snow level, wind speed, the temperature, the light level;
- for a pollution level, classification may be by safe/warning/unsafe, presence/absence of pollutants; attributes may be the ppm value of pollutants;
- for a security related incident, classification may be the type of incident; attributes may be the noise in dB, the location, the radiation level, a chemical composition.

It is further noted that a piece of raw data generated by a data source may also be considered as an attribute. For instance may be regarded as attributes for a sound sensor, a sound recording, for a camera sensor, an image or a video recording, etc.

According to a preferred embodiment, the event comprises one of an event related to an object in the edge device or its vicinity, an event related to a state of an object in the edge device, e.g. a component of the edge device, or its vicinity, an event related to an area in the vicinity of the edge device, an event related to a state of a component of the edge device. In this way, an environmental stimulus valuable for managing a network may be detected. Among other the following events may for instance be detected:

- an event related to an object (both static and dynamic) in the edge device or its vicinity and/or the state of an object in the edge device or its vicinity, where objects may be vehicles, animals, persons, buildings, street furniture (trash bin, bus stop), a communication cabinet, a charging station, a street sign, a traffic sign, a traffic light, a telecommunication cabinet, objects thrown in a trash bin. For instance may then be detected the presence/movement of vehicles and other objects, whether people are wearing a mask or not, a trash bin reaching its full state, the type of object thrown in a trash bin, a surface, such as a street or pavement surface, changing from a dry to a wet state, the state of a traffic sign or a traffic light, the state (in use or not) of a charging station, the state of a parking space;
- an event related to a state of a component of the edge device. For instance a fault condition (leakage current, failed surge protection device, power failure, solder joint failure) in a luminaire head may be detected;
- an event related to the environment itself, for instance the detection of a visibility condition, the detection of a change in the weather like rain, fog, sun, wind, the detection of a pollution level, the detection of a light level, the detection of an incident in the vicinity of the edge device such as a security related incident, e.g. an explosion, a car accident, a fire, flooding, an earthquake, a riot, a gun shot, presence of gas (chemicals), radiation, smoke, etc.

According to a preferred embodiment, the at least one data source comprises at least a first sensor configured to obtain first sensed environmental data and a second sensor configured to obtain second sensed environmental data for the same event, and the edge processing means is configured to select a class for the event based on at least the first and the second sensed environmental data. Alternatively, the at least one data source comprises at least a first sensor configured to obtain first sensed environmental data and a second sensor configured to obtain second sensed environmental data. The edge processing means is configured to select a first class for the event based on the first sensed environmental data and to select a second class for the same event based on the second sensed environmental data. In this way processed edge data from multiple sensors may be combined for an improved accuracy and more specific inferences than could be achieved using a single sensor alone. For instance while optical sensors have high accuracy and a long reach during bright days, they are less reliable in the event of heavy rain or dark nights. In the same way, a micro Doppler radar is able to produce very recognizable features of a car at a close distance, but it creates indistinctive data at far reach. From the acoustic sensor alone it is very difficult to separate two distinct objects but combined with an optical sensor the information pool becomes richer. A multi-sensor edge device accommodating such a combination of sensors may thus have a higher accuracy and speed of detection, for instance of the type of vehicles present in the traffic of a smart-city, than a corresponding single sensor edge device. Preferably, the edge processing means is configured to use the first class to select the second class. In this way, a cascade classification may be achieved. Preferably the first and second sensors are different either by the aiming direction, and/or the type of sensed data and/or the quality of the sensed data. An application may be the calibration of a sensor having a low resolution by a sensor having a high resolution.

The skilled person understands that also more than two sensors may be present in an edge device capable of determining the same type of events or different types of events. Also, data from a first and second sensor may be combined to determine a class instead of deriving a class from the data from a single sensor. In some more advanced embodiments, neighboring edge devices may exchange locally sensed data, and the data from a neighboring edge device may be used to help determining a class of a locally detected event. For example, when a first edge device detects a moving object moving towards a second edge device, it may inform the second edge device that an object is approaching, allowing the second device to obtain data about the object in an improved manner and/or to determine edge processed data in an improved manner.

According to a preferred embodiment, the edge processing means is configured to control the communication means to transmit a single value if the selected first and second classes are the same, or first and second values representative for the selected first and second classes if the first and second classes are not the same. In this way if two sensors on an edge device provide consistent class information, the verified class is transmitted to the fog, if the classes derived from two sensors are diverging, the choice is left to the fog to determine the right class based, e.g. on the information from the subset of edge devices. For example, the fog device may then take into account information from a neighboring edge device about the same event or information from a database in order to determine the correct class. Thus, a balance between an autonomous edge computing and a more resourceful fog computing may then be struck depending on the reliability of the edge pre-processed data.

According to a preferred embodiment, the at least one value for an attribute associated to the event is based on the first and/or the second sensed environmental data. In this way, attributes from multiple sensors may be combined for an improved accuracy and more specific inferences than could be achieved using a single sensor alone.

According to a preferred embodiment, the fog processing means is configured to use data from a database, to process the edge processed data received from said subset. In addition or alternatively, the edge processing means may be configured to use data from a database to process the obtained environmental data. In this way, the classification is improved based on additional data derived from a database. The database may be a local database in the edge and/or the fog device or a central database of the central control system.

According to a preferred embodiment, when the first class is different from the second class, the fog processing means is configured to use data, such as weather related data, from the database to determine whether to select the first or second class for the event, and to generate processed fog data including the determined class for the event. In this way, environmental information from a database affecting the accuracy of sensors in a known way may be taken into account to weight data coming from the sensors. For instance, a camera may have a high accuracy on a sunny day; a sound sensor may have a high accuracy at night, while a radar sensor may not be affected by a rainy day contrary to the camera and the sound sensor. According to another example, where people are being detected by one or more sensors in the subset of edge devices, the fog device may have access to a cellphone database with cellphone data received in the area of the subset, and may use this cellphone data to produce fog processed data about the detected people.

According to a preferred embodiment, the fog processing means is configured to augment the fog processed data using data from the database. In this way, more depth into the classification can be achieved by augmenting the fog processed data. For instance, special vehicles like ambulances may be further identified using data from a dedicated database. According to another example, the fog device has access to a database with geo-coordinates of the edge devices of the subset, and augments the determined class of an event with one or more geo-coordinates of the one or more edge devices of the subset that have detected the event.

According to a preferred embodiment, the data in the database includes any one or more of the following: weather related information, traffic information, geo-coordinates, news and internet information, public transportation information, events (fairs, concerts, etc) schedules, timing information (weekday, weekend, public holiday), public safety information, sanitary reports, security reports, road condition reports and cellphone data of cellphones. Preferably the data in a database of the fog device includes any one or more of the following: weather related information for the vicinity of the subset, traffic information for the vicinity of the subset, geo-coordinates of the edge devices of the subset, news and internet information in the vicinity of the subset, public transportation information related to the vicinity of the subset, schedules of events in the vicinity of the subset, timing information for the vicinity of the subset, public safety information of the vicinity of the subset, sanitary reports of the vicinity of the subset, security reports in the vicinity of the subset, road condition reports in the vicinity of the subset, cellphone data of cellphones in the vicinity of the subset. In this way, context data related to the local level of the edge device or related to the regional level of the fog device may be incorporated in the decision making at the fog device for further accuracy.

According to a preferred embodiment, each fog device is configured to take decisions on the processing and transmitting of data, said decisions including one or more of the following: whether or not received edge processed data is to be processed by the fog device or to be transmitted to the central control system; whether or not fog processed data is to be transmitted to the central control system. In this way, the process of decision making is dynamically shifted between the central control system and the fog depending on circumstances, for further swiftness of the system. In other words, a large degree of autonomy may be given to the fog device.

In some further developed embodiments also some edge devices may have an increased degree of autonomy. For example an edge device may be configured to take decisions on the processing and transmitting of the obtained environmental data, said decisions including one or more of the following:

- whether or not the obtained data is to be processed by the edge device or to be transmitted to the fog device;
- whether or not data processed by the edge device is to be transmitted to the fog device.

According to a preferred embodiment, the at least one data source comprises at least one sensor, preferably at least two sensors. In particular, the at least one data source may comprise at least one of, preferably at least two of: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor, a vibration sensor, a metering device (e.g. a metering device for measuring the power consumption of a component of the edge device, more in particular a metering device for measuring the power consumption of a driver of a luminaire), a malfunctioning sensor (e.g. a sensor for detecting the malfunctioning of a component of the edge device such as a current leakage detector for measuring current leaks in a driver of a luminaire), a measurement device for measuring a maintenance related parameter of a component of the edge device, an alarm device (e.g. a push button which a user can push in the event of an alarming situation). In this way, environmental data about an event in the vicinity of an edge device or in the edge device may be detected, e.g. characteristics (presence, absence, state, number) of objects like vehicles, street furniture, animals, persons, sub-parts of the edge device, or properties related to the environment (like weather (rain, fog, sun, wind), pollution, visibility, earth quake) or security related events (explosion, incident, gun shot, user alarm) in the vicinity of the edge device, maintenance related data or malfunctioning data of a component of an edge device.

According to an exemplary embodiment, a sensor of the one or more sensors may be mounted in a housing of an edge device, e.g. a luminaire, in an orientable manner. An example of a suitable mounting structure is disclosed in WO 2019/243331 A1 in the name of the applicant which is included herein by reference. Such mounting structure may be used for arranging e.g. an optical sensor in the housing of an edge device. Other suitable mounting structures for sensors are described in WO 2019/053259 A1, WO 2019/092273 A1, WO 2020/053342 A1, WO 2021/094612 A1, all of which are in the name of the applicant and included herein by reference. Although those patent specifications relate in particular to luminaire edge devices in which one or more sensors are provided, the skilled person understands that one or more sensors may be mounted in a similar way in another type of edge device.

Depending on the type of data that is being sensed and the possible related actions, the sensed data may be processed in the edge device and the edge processed data may be sent to the fog device for further processing and/or the sensed data may be used locally for taking actions within the edge device. For example, when the edge device is a luminaire and an alarm button is pushed, it may be determined locally to switch on the light source with a blinking pattern and/or to indicate otherwise (e.g. through a loudspeaker or display if present) that there is an alarm situation in the vicinity of the edge device), to capture image and to immediately send it to the fog device with a request to alert the police. According to another example, maintenance related data is processed locally at the edge device and transmitted at regular time intervals (e.g. monthly) to the fog device unless the maintenance data indicates that a critical situation exists. The fog device may group the edge processed maintenance data from its subset of edge devices and transmit it to the central control system.

According to a preferred embodiment, the at least one data source comprises an image sensor configured to sense raw image data of the event, wherein the edge processing means is configured to process the sensed raw image data to select a class from a plurality of classes relating to the type of object involved in the event, to generate an image attribute associated with the event, and to include said class and said image attribute in the edge processed data. In this way, bandwidth may be saved. For instance edges of an object may be extracted from a sensed image, or a license plate may be extracted from a sensed image. The attribute may be aggregated to the image classification. In this way, a more complete and at the same time compact information may be transmitted from the edge device to the fog device. Alternatively, the plurality of classes may be related to the type of event or a property of the event.

According to a preferred embodiment, the at least one data source comprises a sound sensor configured to sense sound data of the event, wherein the edge processing means is configured to select a class from a plurality of classes according to the type of object involved in the event, and to include the determined class in the edge processed data. In this way, classification of objects like the classification of different types of vehicles may be achieved. Additionally an attribute associated to the sensed sound data may be also generated and aggregated to the sound classification. A sound attribute may be a sound level, a frequency of a sound, duration of said sound for instance. Preferably a sound attribute may be a frequency band related to a certain type of vehicle, e.g. frequency band of the noise generated by electric cars/non electric cars. In this way a more complete and at the same time compact information may be transmitted from the edge device to the fog device. Alternatively, the plurality of classes may be related to the type of event or a property of the event.

According to a preferred embodiment, the at least one data source comprises a radar sensor configured to sense radar data, wherein the edge processing means is configured to process the sensed radar image data to select a class from a plurality of classes relating to the type of object involved in the event, to generate a speed attribute associated with said object, and to include said class and said speed attribute in the edge processed data. In this way, bandwidth may be saved. For instance speed may be detected. The speed attribute may be aggregated to the radar classification. In this way, a more complete and at the same time compact information may be transmitted from the edge device to the fog device. Alternatively, the plurality of classes may be related to the type of event or a property of the event.

More in particular, all three types of sensors: optical, sound and radar may be connected to the same common interface support such that the combination of sensors can be easily interconnected in any kind of edge device in a cost-effective manner.

According to a preferred embodiment, the first and the second sensor are selected from an optical sensor such as a photodetector or an image sensor, a sound sensor, and a radar such as a Doppler effect radar. It has been found that the combination of these three sensors in an edge device allows for an accurate classification of objects in the vicinity of the edge device, at all times of the day.

According to a preferred embodiment, each fog device and associated subset of edge devices are arranged in a mesh network. In this way edge devices can communicate directly with each other for a fast control. Reliability is also further improved due to redundant communication links. Preferably the edge communication means and the fog communication means are configured to communicate through an IEEE 802.15.4 protocol.

Preferably, the edge devices are configured to transmit edge processed data to its associated fog device using a wireless personal area network (WPAN), preferably as defined in the IEEE 802.15.4 standard. According to another exemplary embodiment, the edge devices are configured to transmit edge processed data to its associated fog device through an LPWAN network, e.g. a LoRaWAN network or a SigFox network.

For example, the communication between the edge devices and its associated fog device may be based on a short range protocol such as IEEE 802.15.4 (e.g. Zigbee) or on a long range communication protocol such as LoRa wireless data communication technology. The network may be managed by the fog device or by a separate segment controller. In such a solution the edge device may only be capable of communicating through the short range communication protocol. However, it is also possible that some edge devices are capable of communicating both through a short-range and a long-range protocol. Also the fog device may be integrated with one of the edge devices, e.g. one of the luminaires of a group of luminaires could function as the fog device for a group of edge devices comprising the group of luminaires and possibly also other edge devices.

Preferably, the fog devices and the central control system communicate through a network comprising a cellular network.

According to a preferred embodiment, the fog device is configured to control the fog processing means using a machine learning model. In addition or alternatively, an edge device may be configured to control the at least one data source and the edge processing means using a machine learning model. In this way the fog device and/or the edge device is rendered more autonomous. In addition or alternatively the fog device may be configured to control at least one edge device using a machine learning model to also gain more autonomy in decision-making. For instance neural networks may be envisaged in the fog and/or edge processing means.

According to a preferred embodiment, the edge device is configured to control the edge processing means to update the predetermined classes for classifying. Additionally or alternatively the fog device is configured to control the edge processing means to update the predetermined classes for classifying. In this way, a self-learning system with an increased autonomy, accuracy and resilience is obtained.

According to a preferred embodiment, each subset of edge devices comprises at least ten edge devices, preferably at least fifty edge devices. In this way, a smart-city architecture covering regional areas associated with a fog device may be introduced in a flexible manner. In one possible implementation each fog device may be associated with a fixed subset of edge devices. However, it is also possible that a fog device is associated with a subset which varies over time, e.g. because an additional edge or fog device has been added or because the central control system has learned over time that one of the edge devices would be more useful in a neighboring subset of edge devices. Also, in some implementations an edge device may be part of two neighboring subsets and communicate with two fog devices.

Also, in preferred embodiments one fog device can communicate with another fog device of the plurality of fog devices, more preferably at least with a neighboring fog device. Especially when tracking and/or classifying moving objects such an implementation is preferred.

According to a preferred embodiment, the plurality of edge devices comprises any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, an access lid in a pavement. Existing structures ubiquitously present in cities may be used for hosting edge device functionalities, limiting in this way the aesthetic impact of installing such functionalities. Structures having already an access to the power grid are particularly interesting, while luminaires having just the right height to capture all kinds of valuable data from sensors are further particularly suited as edge devices.

According to a preferred embodiment, the fog device is configured to transmit control data based on fog processed data to an edge device of the plurality of edge devices. The edge device comprises a controller configured to control a component thereof in function of the received control data. In this way, a fog device may control an edge device, e.g. to switch on or off a component of the edge device, e.g. switch on or off a light source of a luminaire, or to switch off a component of the edge device which is malfunctioning, e.g. to turn off a sensor of the edge device when it is determined by the fog device that the sensor no longer performs accurate sensing. In addition or alternatively, the edge device may be configured to transmit control data based on edge processed data to another edge device of the plurality of edge devices, and/or the edge device may comprise a controller configured to control a component thereof in function of the fog and/or edge processed data. In this way, an edge device may quickly communicate to and act on an adjacent edge device, to turn on an adjacent luminaire for instance when a car is detected to be moving towards the adjacent luminaire.

According to a preferred embodiment, the fog processing means comprises at least three RF front end devices to communicate with at least two edge devices and the central control means. In this way, a fog device is provided with the necessary circuitry for RF communications with at least two edge devices and the central control means.

In an exemplary embodiment, the at least one data source comprises at least two sensors connected to a common interface board of the edge device. In this way a universal interface may be provided insuring compatibility of data and power signals between sensors and edge processing means.

According to a preferred embodiment, an edge module, preferably for use in a system according to any one of the previous embodiments, comprising at least two sensors, and further comprising a common interface board for interconnecting said at least two sensors to the edge processing means of an edge device, wherein the common interface board comprises signal level translation means for translating data signal levels between the at least two sensors and the edge processing means and/or power conversion and management means for receiving power from a power source and for converting the received power to a power for powering the at least two sensors. In this way, a universal interface is provided to interface any one or more sensors with any edge processing means. Standardized edge device processing means may then easily be coupled to any sensor without incompatibility issues. In this way compatibility in terms of data levels and power levels is insured between the edge processing means and the one or more sensors. The common interface is then a universal platform for data and power compatibility. Preferably the at least two sensors are taken from an optical sensor such as a photodetector or an image sensor, a sound sensor, and a radar such as a Doppler effect radar.

BRIEF DESCRIPTION OF THE FIGURES

This and other aspects of the present invention will now be described in more detail, with reference to the appended drawings showing preferred embodiments of the invention. Like numbers refer to like features throughout the drawings

DESCRIPTION OF EMBODIMENTS

Figure 1:
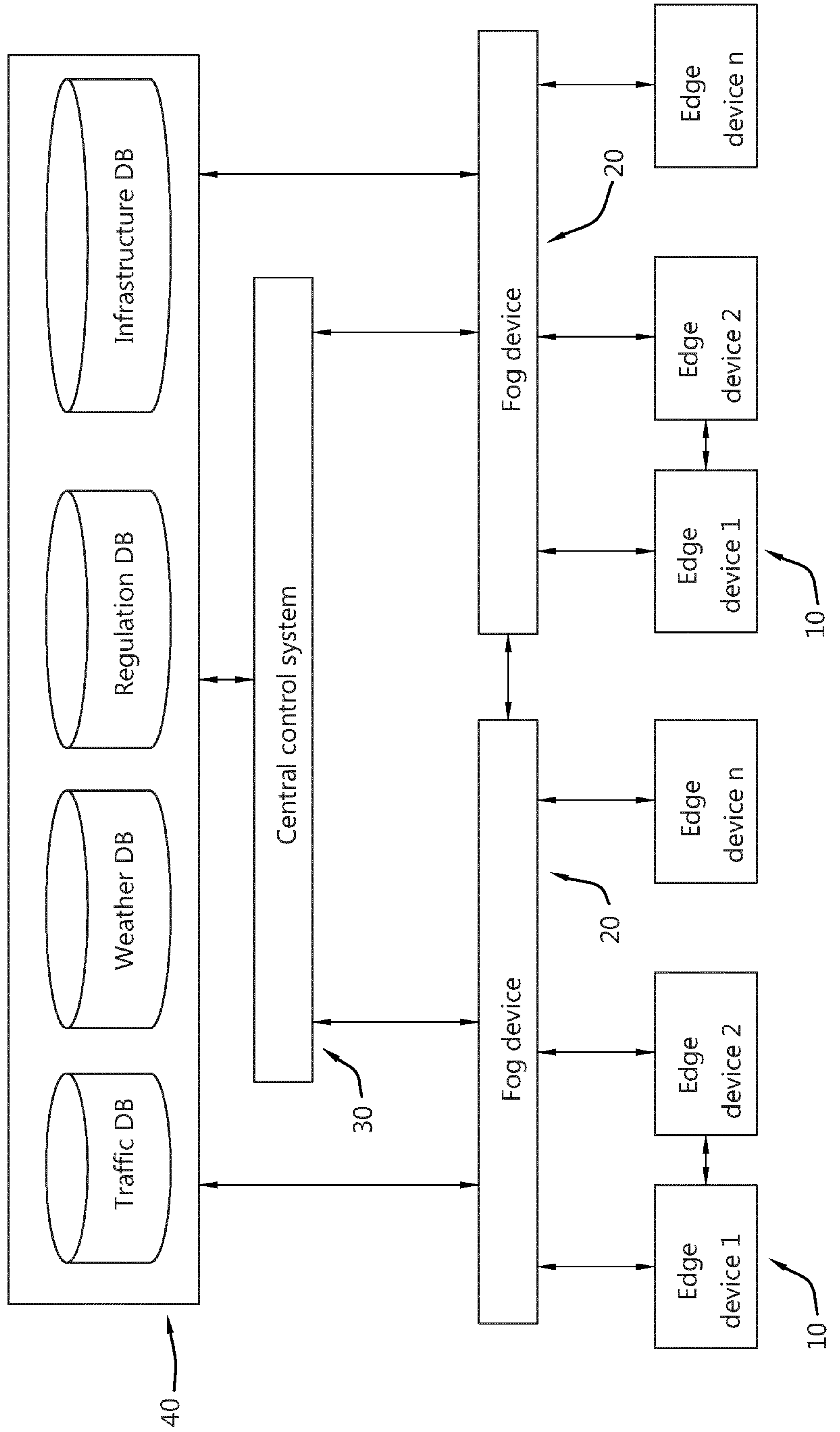
FIG. 1 illustrates an exemplary embodiment of a network architecture.

FIG. 1 illustrates a network system according to an exemplary embodiment. The network has a hierarchical architecture, with a first level of edge devices 10, an intermediate level of fog devices 20 and a top level with a central control system 30.

The network system of FIG. 1 comprises a plurality of edge devices 10 arranged at a plurality of locations. The edge devices may for instance be spread in a smart-city and the plurality of edge devices 10 may comprise any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, a lid arranged in a pavement. This list is not exhaustive and other edge devices may be envisaged depending on circumstances.

The network further comprises a plurality of fog devices 20, each fog device 20 being associated with a subset of a plurality of edge devices 10, while a central control system 30 is in communication with the plurality of fog devices 20 and is configured to receive fog processed data from the plurality of fog devices 20 and send control data to the plurality of fog devices 20. It is noted that although represented as a fixed subset of edge devices in FIG. 1, a subset of edge devices 10 may change over time and an edge-device 10 may be or become part of more than one subset, providing for instance some overlap between geographically adjacent subsets. Fog devices may further be configured to communicate with each other depending on circumstances.

Preferably, a fog device 20 and the associated subset of edge devices 10 may be arranged in a mesh network. For example, the edge devices may be configured to transmit edge processed data to its associated fog device and receive control data from its associated fog device using a wireless personal area network (WPAN), preferably as defined in the IEEE 802.15.4 standard. Thus, the communication between the edge devices 10 and its associated fog device 20 may be based on a short range protocol such as IEEE 802.15.4 (e.g. Zigbee). The network may be managed by the fog device or by a separate segment controller.

A fog device 20 may be defined as having less processing and storage capabilities than a central control means 30 but more processing, storage and communication capabilities than an edge device 10. When the central control means 30 operate under the principle of cloud computing, the intermediate level of processing performed by fog devices 20 is referred to as fog computing. Fog computing may comprise a certain degree of distribution of the processing among a plurality of fog devices 20 arranged in a mesh with the edge devices 10.

A segment controller insofar as able to communicate with at least two edge devices 10 via short range communications and able to communicate with a central control means 30 via long range communications, may operate as a fog device 10 according to the present invention.

The plurality of fog devices 20 may be configured to communicate with the central control system through a cellular network.

In such a solution the edge device 10 may only be capable of communicating through the short range communication protocol. However, it is also possible that at least some edge devices 10 are capable of communicating both through a short-range protocol and a long-range protocol (e.g. through the cellular network). Also a fog device 20 may be integrated with one of the edge devices 10, e.g. one of the luminaires of a group of luminaires could function as the fog device for a group of edge devices comprising the group of luminaires and possibly also other edge devices.

Each fog device 20 may be associated with a subset of a plurality of edge devices 10 located geographically in the vicinity of each other and forming a regional subset of edge devices 10. In an example a subset of edge devices 10 may be defined for edge devices installed in the same neighborhood, whether installed on luminaires, traffic lights, trash bins or any other infrastructure. The subset may alternatively be selected on the basis of a common purpose or property between edge devices 10. In an example, a subset of edge devices may be defined for edge devices installed on luminaires lighting the same road.

Additionally a database level 40 may be provided and may comprise among others a traffic database, a weather database, a regulation database or an infrastructure database. The database level 40 may be in communication with the plurality of fog devices 20 and/or the central control system 30.

Figure 2:
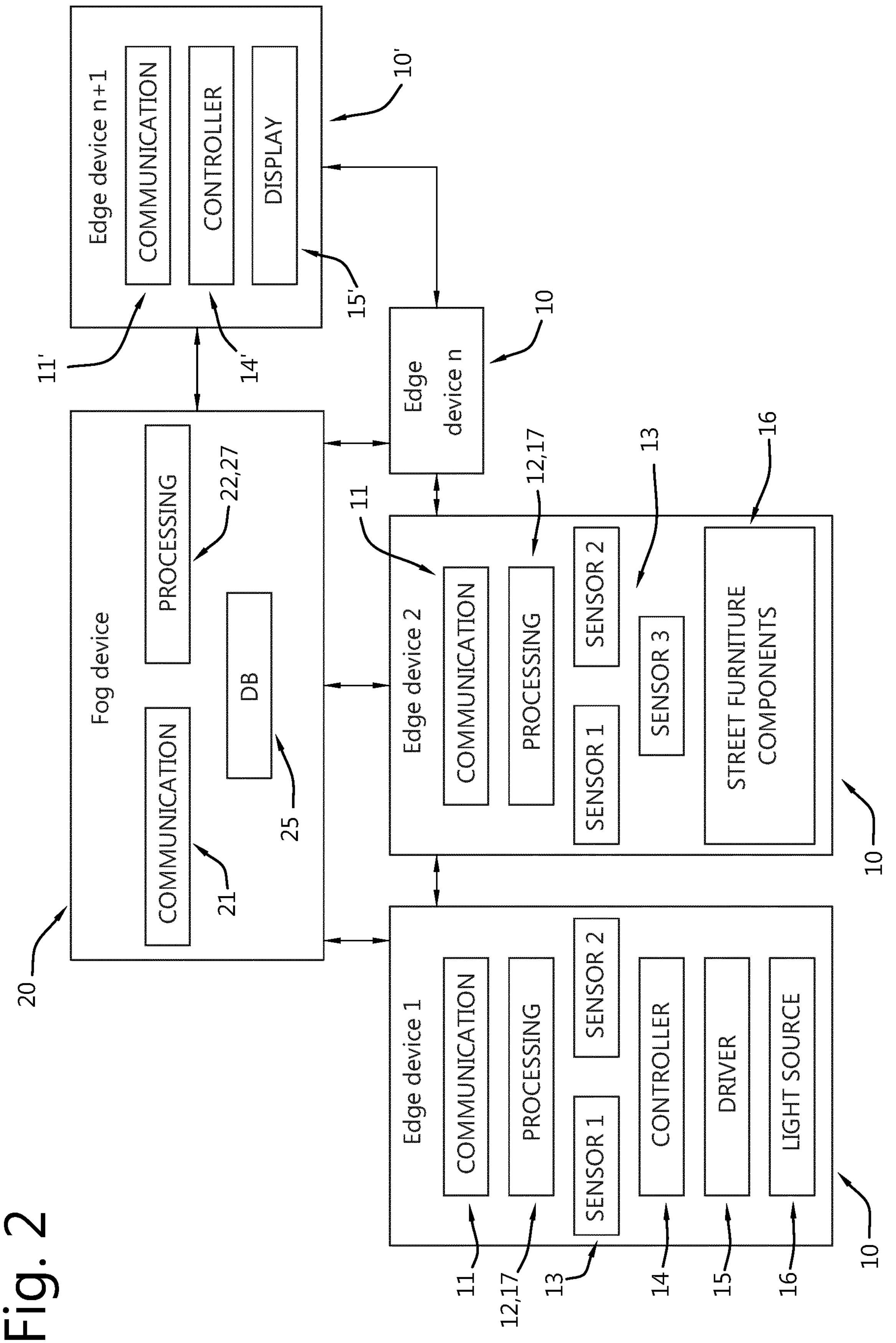
FIG. 2 illustrates the regional level of the architecture showing an exemplary embodiment of a fog device and multiple edge devices.

FIG. 2 illustrates further the regional level of the architecture of FIG. 1, where a fog device 20 is associated with a subset of edge devices 10, 10'. The edge devices 10 which are numbered as 1, 2, . . . n each comprise at least one data source 13, such as a sensor, configured to obtain environmental data, said environmental data being related to an event in the respective edge device or its vicinity. In addition, the subset of edge devices 10, 10' may comprise edge devices 10' (only one is shown which is numbered as n+1) which do not contain data sources, but which are still capable of communicating with the fog device 20. All edge devices 10, 10' comprise an edge communication means 11, 11' configured for communicating with the fog device 20.

The first and second edge device 10 further comprise each an edge communication means 11 for communicating edge processed data based on obtained environmental data. The edge processed data may comprise at least one value representative for a class selected for the event from each data sources 13, and/or at least one value representative of an attribute associated to the event. An attribute may be a property characterising an event, where characterising may be among others quantifying or illustrating.

An event may be classified into a predetermined set of classes and associated with a predetermined list of attributes, depending on the event.

In particular, the following sets of classes and attributes may be of interest for the following events/objects involved in events:

- for vehicles, classification may be by type of vehicle (car, truck, motorcycle, bicycle), size of vehicle (big, small, intermediate), model of vehicle, color of vehicle; and a corresponding set of attributes may be number plate, speed, direction, number of occupants;
- for animals, classification may be by type of animal; leashed or not; normal/violent behavior
- for persons, classification may be by type of individual whether civil/military/policeman/first responder; normal/violent behavior, moving/static, wearing a mask/not wearing a mask; and a corresponding list of characterization attributes may be speed, direction, number of people;
- for buildings, classification may be by type of building; an attribute may be the location,
- for street furniture, classification may be by type, status; an attribute may be the location;
- for a driver for driving a light source of a luminaire, classification may be by status (normal/abnormal behavior), attributes may be the power consumption value;
- for a trash bin, a traffic light, a charging station, a parking station, classification may be by status (full/not full, available/unavailable, operational/out of order), attributes may be the location
- for a street or pavement surface, classification may be according to status (dry/wet), attribute may be the amount of humidity, an attribute may be the location;
- for a visibility condition, classification may be good/bad visibility;
- for a noise, classification may be by noise level above a threshold, attributes may be frequency, level, duration of the noise;
- for a change in the weather, classification may be by type of weather (fog, sun, rain, wind);
- attributes may be the amount of rain, humidity level, snow level, wind speed, the temperature, the light level;
- for a pollution level, classification may be safe/warning/unsafe, presence of pollutants; attributes may be the value ppm of pollutants;
- for a security related incident, classification may be the type of incident; attributes may be the noise in dB, the location, the radiation level, a chemical composition.

The list above is not exhaustive, and other classes and/or attributes may be used depending on the circumstances and the purpose of the network system.

The first edge device 10 (Edge device 1) may comprise two sensors, Sensor 1, Sensor 2, as data sources 13, each configured to obtain environmental data related to an event in the edge device 10 or its vicinity. In a similar way the second edge device 10 (Edge device 2) may comprise three sensors, Sensor 1, Sensor 2, Sensor 3, as data sources 13, each sensor being also configured to obtain environmental data related to an event in the edge device 10 or its vicinity. The first sensor may be configured to obtain first sensed data and the second sensor configured to obtain second sensed data.

An event in an edge device or its vicinity may comprise one of:

- an event related to an object (both static and dynamic) in the edge device or its vicinity and/or the state of an object in the edge device or its vicinity, where objects may be vehicles, animals, persons, buildings, street furniture (trash bin, bus stop), a communication cabinet, a charging station, a street sign, a traffic sign, a traffic light, a telecommunication cabinet, objects thrown in a trash bin, other objects not part of the edge device self. For instance may then be detected the presence/movement of vehicles and other objects, whether people are wearing a mask or not, a trash bin reaching its full state, the type of object thrown in a trash bin, a surface, such as a street or pavement surface, changing from a dry to a wet state, the state of a traffic sign or a traffic light, the state (in use or not) of a charging station, the state of a parking space;
- an event related to a state of a component of the edge device. For instance a fault condition (leakage current failed surge protection device, power failure, solder joint failure) in a luminaire head may be detected;
- an event related to the environment itself, for instance the detection of a visibility condition, the detection of a change in the weather like rain, fog, sun, wind, the detection of a pollution level, the detection of a light level, the detection of an incident in the vicinity of the edge device such as a security related incident, e.g. an explosion, a car accident, a fire, flooding, presence of gas (chemicals), radiation, smoke.

The list above is not exhaustive, and other events of interest may be detected depending on the circumstances and the purpose of the network system.

More generally, the data sources 13 may comprise at least one of, preferably at least two sensors, of the following list: an optical sensor such as a photodetector or an image sensor, a sound sensor, a radar such as a Doppler effect radar, a LIDAR, a humidity sensor, a pollution sensor, a temperature sensor, a motion sensor, an antenna, an RF sensor capable of detecting radio waves from RF-enabled devices (such as phones, WiFi access points, Bluetooth devices and other devices), a vibration sensor, a metering device, a malfunctioning sensor, a measurement device for measuring a maintenance related parameter of a component of the edge device, an alarm device. The list above is not exhaustive, and other sensors may be envisaged depending on circumstances. In particular the data source 13 of the first edge device may comprise an optical sensor such as a photodetector or an image sensor, a sound sensor and a radar such as a Doppler effect radar. Such a combination of sensors is both practical and efficient mimicking the human senses of touch, hearing and sight.

The first and second edge device 10 further comprise an edge processing means 12 configured to produce edge processed data based on the sensed environmental data, the edge processed data comprising at least one value representative for a class selected for classifying the event. For instance, the data source 13 of the first edge device may comprise a sound sensor configured to sense sound data, and the edge processing means 12 may be configured to perform sound classification of the sensed sound data, and to include the selected classification in the edge processed data. In particular, for traffic control, sound may be used to efficiently detect different sub-classes of vehicles.

Some practical examples are further given for illustration:

In an example where the network system is applied in the context of a toll station, and the event detected relates to the presence of vehicles, the class selected for the event may relate to the type of vehicle detected, whether a car, a motorcycle, a bike or a truck.

In another example, when the network system is applied to a network of smart trash bins in a smart-city and the event detected may be the remaining available countenance of the trash bin, the class selected for the event may relate to the status of the bin, whether full and out-of-order or still in use.

In another example where the network system is applied in the context of smart lighting and the event detected may relate to the detection of a moving object (e.g. car, pedestrian, cyclist) along a road provided with luminaires, the selected class may relate to the type of moving object and optionally an associated required lighting status, e.g. a stand-by lighting mode or an active lighting-mode.

In another example where the network system is applied in the context of traffic control in a smart-city and the event may relate to the detection of the movement of vehicles, or to pollution levels, the selected class may relate to the fluidity of the traffic, whether fluid or jammed, or to the composition of the traffic, whether the proportion of trucks is above or below a threshold level, or for pollution, whether pollutions levels are above or below health safety norms.

In another example where the network system is applied in the context of security control in a smart-city and the event may relate to the detection of the sanitary situation in a crowd, the selected class may relate to whether individuals in the crowd are wearing or not a face mask, and an attribute may then be the number or percentage of people wearing a mask.

The first and second edge device 10 may further comprise one or more additional elements depending on the type of edge device. The first edge device 10 illustrated in FIG. 2 may be a luminaire head comprising a controller 14 for controlling one or more components of a luminaire such as a driver 15 for driving a light source 16 of the luminaire. The second edge device 10 of FIG. 2 may be a smart street furniture component, like a smart connected IoT trash bin comprising street furniture components 16.

As explained above, the subset of edge devices 10, 10' may further comprise one or more additional edges device n like the first and the second edge device and/or one ore more additional edge devices n+1 without a data source. An edge device labelled n may comprise a data source to exchange in a bidirectional manner data with the fog device 20 whereas an edge device labelled n+1 may for example be exempt of a data source and merely act as a receiver for the fog device 20. For example, if the fog device detects an alarm situation based on edge processed data received from edge devices 10, it may control an edge device 10' to take an appropriate action, e.g. signal an alarm situation to the controller 14' of the edge device 10' in order to display an appropriate message on a display 15'. The alarm situation could be e.g. a high level of pollution.

The fog device 20 in FIG. 2, associated with the subset of said plurality of edge devices 10, 10' described above, comprises a fog communication means 21 configured to receive edge processed data from the edge devices 10, numbered 1 to n, and to transmit fog processed data to all or at least some of edge devices 10, 10', numbered 1 to n+1. The fog communication means 21 is also configured to receive control data from the central control system and to optionally send control data to at least some of the edge devices 10, 10'. The fog device 20 further comprises a fog processing means 22 configured to process the edge processed data received from the subset and to produce fog processed data based thereon, the fog processed data comprising information about at least one event in the edge devices 10 or their vicinity. It is further noted that a fog processing means 22 may be configured to process other data such as raw unprocessed data.

The fog device 20 may further comprise a database 25 and the fog processing means 22 may be configured to use data from the database 25, to process the edge processed data received from the edge devices 1 to n. The data in the database 25 of the fog device 20 may include any one or more of the following: weather related information for the vicinity of the subset, traffic information for the vicinity of the subset, geo-coordinates of the edge devices of the subset. The data in the database 25 may be obtained from the central control system 30 and may included data from the external databases 40 discussed above.

In the example mentioned above, where the network system is applied in the context of traffic control in a smart-city and where the event may relate to the detection of the movement of vehicles and the selected class may be related to the composition of the traffic (for instance whether the proportion of trucks has exceeded a certain level), a database could contain additional information allowing the recognition of special vehicles like ambulances, police cars and firefighting trucks, so that these special vehicles would not be counted in the truck traffic.

Another aspect of this architecture will now be discussed and relates to data fusion. The second edge device 2 of FIG. 2 comprises for instance a first sensor, Sensor 1, configured to obtain first sensed data and a second sensor, Sensor 2, configured to obtain second sensed data. The edge processing means 12 may then be configured to select a first class for an event based on the first sensed data and to select a second class for the same event based on the second sensed data. The edge processing means 12 may then be configured to control the communication means 11 to transmit a single value if the selected first and second classes are the same, or the first and second values representative for the selected first and second classes if the first and second classes are not the same.

When the first class is different from the second class, the fog processing means 22 may be configured to use the data, such as weather related data, from the database 25 and/or the database 40 to determine whether to select the first or second class for the event, and to generate processed fog data including the selected class for the event.

For instance, if the first sensor is an optical camera and the second sensor is a sound sensor. In case of diverging selected classes for the detection of a vehicle in a traffic control system, depending on whether it is day or night, one of the two sensors will be given priority. At night, a sound sensor is likely to be more precise while during day the optical sensor is likely to be more accurate. If the first sensor is an optical camera and the second sensor is a Doppler effect radar, depending on the weather, one of the two sensors will be given priority. On a sunny day, an optical camera is likely to be more precise, whereas on a rainy day the accuracy of the Doppler effect radar may be favored. In this way, weather/environment related information affecting the accuracy of sensors in a known way may be taken into account to weight data coming from the sensors. For instance, a camera may have a high accuracy on a sunny day; a sound sensor may have a high accuracy at night, while a radar sensor may not be affected by a rainy day contrary to the camera and the sound sensor.

According to a further aspect of the sensor management, an edge device 10 may be configured to control its one or more sensors and its edge processing means 12 using a machine learning model. For instance neural networks may be envisaged in the edge processing means 12.

According to another aspect, the fog device 20 may be configured to transmit control data based on fog processed data to an edge device 10, 10' of the plurality of edge devices 10, 10', and one or more edge devices 10, 10' may comprises a controller 14, 14' configured to control a component 15, 15' thereof in function of the received control data. In an example, the driver 15 of a luminaire may be controlled by a controller 14 receiving control data from the fog device 20, software and model updates relating to classification may be transmitted from a fog device 20 to an edge device 10, or a sensor may be turned off when the fog device 20 has established that its sensing is inaccurate. In another example, a display 15' of a street display may be controlled by a controller 14' receiving data from the fog device 20. It is further noted that such a control of a component 15 may also be based on edge processed data. For instance a display on a bin may be changed to indicate an "out of order" status based on edge-processed data only.

In a further embodiment, a data source 13 may comprise an image sensor configured to sense raw image data, and the edge processing means 12 may be configured to perform data compression of the sensed raw image data, and to include compressed image data in the edge processed data, e.g. compressed image data showing the event.

Figure 3:
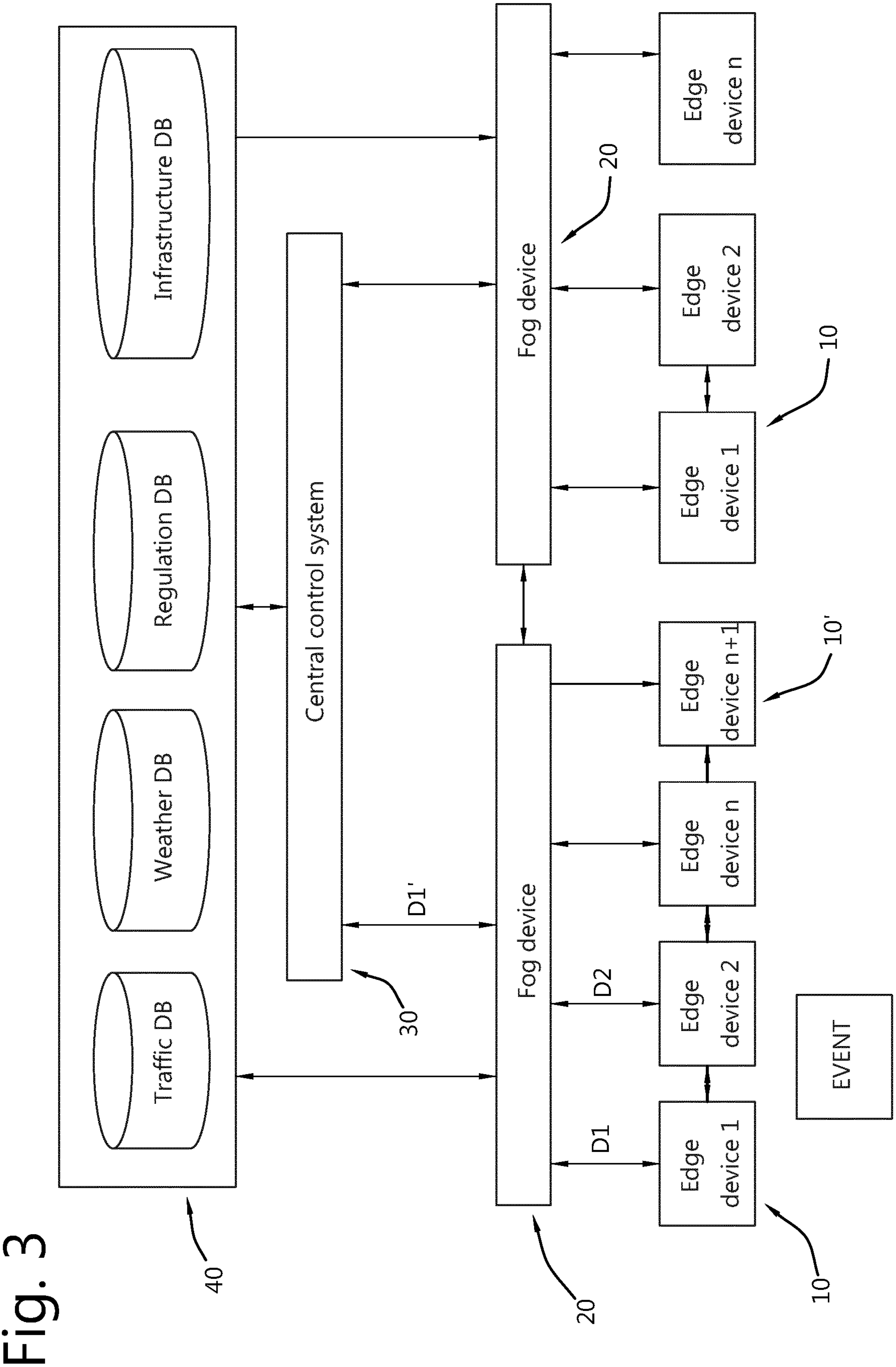
FIG. 3 illustrates a scenario where an event is observed by two edge devices.

FIG. 3 illustrates a scenario where an event is observed by two edge devices 10 of a subset of n+1 edge devices 10, 10' connected to the same fog device 20. The first and the second edge devices numbered Edge device 1 and Edge device 2 may be adjacent geographically but the teachings of this embodiment should not be limited to this option. The fog device 20 may receive first edge processed data D1 about an event from Edge device 1 and second edge processed data D2 about an event from Edge device 2. The fog device 20 may process the first and second edge processed data, D1 and D2, to determine whether or not the first and second edge processed data D1, D2, relate to the same event, and to transmit fog processed data Dr to the central control system in accordance with the determined result. Additionally more than two streams of edge processed data or other data (e.g. data from a database) may be compiled to generate the fog processed data Dr, and/or more than one event in common may be compiled between the different streams of edge processed data D1-Dn from the subset of Edge devices 1-n connected to the fog device 20.

Additionally the fog device 20 may augment the fog processed data D1' using data from a local database (not shown in FIG. 3 but see e.g. database 25 in FIG. 2) or from one of the databases of the database level 40. In one example, the geographical location of an edge device 10 or of multiple edge devices 10 where multiple edge devices have detected the same event, may be added to the fog processed data D1' prior to transmission to the central control system 30 to augment the data. In the case of a city network of trash bins, once the fog has processed which bins are full, a GPS location of each bin may be added to generate an itinerary for the garbage collection services, before sending the data to the central control system 30.

In another aspect, a fog device 20 may be configured to take decisions on the processing and transmitting of the data, said decisions including one or more of the following:

whether or not received data is to be processed by the fog device or to be transmitted to the central control system;

whether or not data processed by the fog device is to be transmitted to the central control system.

It is noted that for some data, the fog device 20 may work autonomously independent of the central control system 30.

According to another aspect a fog device 20 and its associated subset of edge devices 10 may be arranged in a mesh network, where multiple interconnections between edge devices 10 of the subset may be provided. In some network situations, the latency issue may favor a direct edge processing and edge-to-edge communication via the mesh. One example thereof may be for a luminaire network detecting at night an incoming car in a tunnel, communicating to adjacent luminaires in the tunnel directly the need to brighten the lighting without first waiting for the confirmation of the fog device 20. The idea is that an edge device 10 could also send directly control signals to a component 15 of one or more of its neighbors if the need would arise.

The fog devices and edge devices may use a messaging layer protocol for communicating with each other. An exemplary messaging layer M2M protocol is the Lightweight Machine to Machine (LwM2M) protocol defined in Lightweight Machine to Machine Technical Specification, last approved version 1.1.1, Open Mobile Alliance, 25 Jun. 2019. The M2M client device (e.g. included in an edge device) may be configured to obtain environmental data and to generate edge processed data and notify the M2M server device regarding the obtained environmental data and/or the edge processed data. The M2M server device (e.g. included in a fog device) may perform one or more actions in response to the notification.

Figure 4:
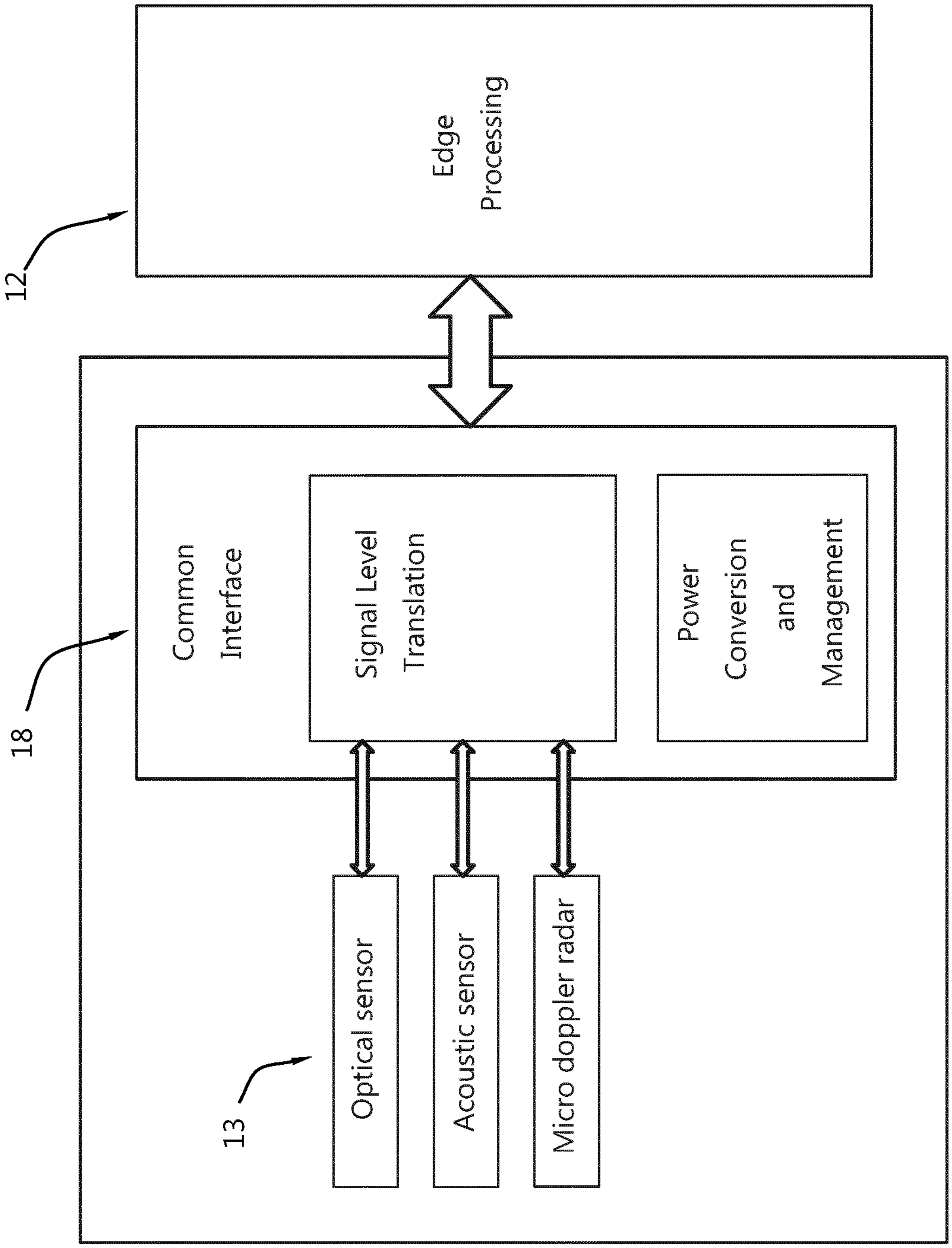
FIG. 4 illustrates an exemplary embodiment of an edge module comprising a common interface and three sensors.

FIG. 4 illustrates an exemplary embodiment of an edge module comprising a common interface board 18 and three sensors 13, the edge module being connectable to an edge processing means 12. In this exemplary embodiment, three sensors 13 are arranged on the same edge device 10. The data sensors are an optical sensor, an acoustic sensor and a micro-Doppler radar. A common interface 18 is interposed between the sensors 13 and the edge processing means 12 to provide a universal interface that achieves modularity while ensuring compatibility of both data and power signals. To this end, the common interface 18 comprises a signal level translation means for adapting/translating data signal levels of data signals communicated between sensors 13 and processing means 12. An optical sensor may for instance communicate using a MIPI C-PHY or LVDS interface, an acoustic sensor may communicate using an $I^2S$ interface, and a micro Doppler radar may communicate using a combination of MIPI C-PHY or LVDS and SPI interfaces. Such standards define the physical layer but not their signal levels. The translation means will then be configured to adapt/normalize these signals to a common signal level, allowing sensors 13 to be able to communicate in a fast, secure and reliable manner with the processing means 12.

The common interface 18 further comprises a power conversion and management means for receiving power from a power source and for converting it, in an efficient manner, into power suitable for powering the sensors 13. Since, each sensor may have different power requirements. The common interface is designed in a manner that it can interact with different data and power standards and ensure compatibility between the devices attached to it. The power source may be envisaged in various ways. For instance, the edge processing means 12 may deliver power to the common interface 18 coming directly from the mains and/or indirectly coming from the driver. Preferably limiting the amount of AC to DC conversions. Alternatively, or additionally the driver may deliver power directly to the common interface 18. In an alternative the edge processing means 12 may have the ability to make smart decisions on which source of power to select depending on the circumstances as well as which sensors to enable/disable in order to ensure the best accuracy at the lowest power consumption.

Figure 5:
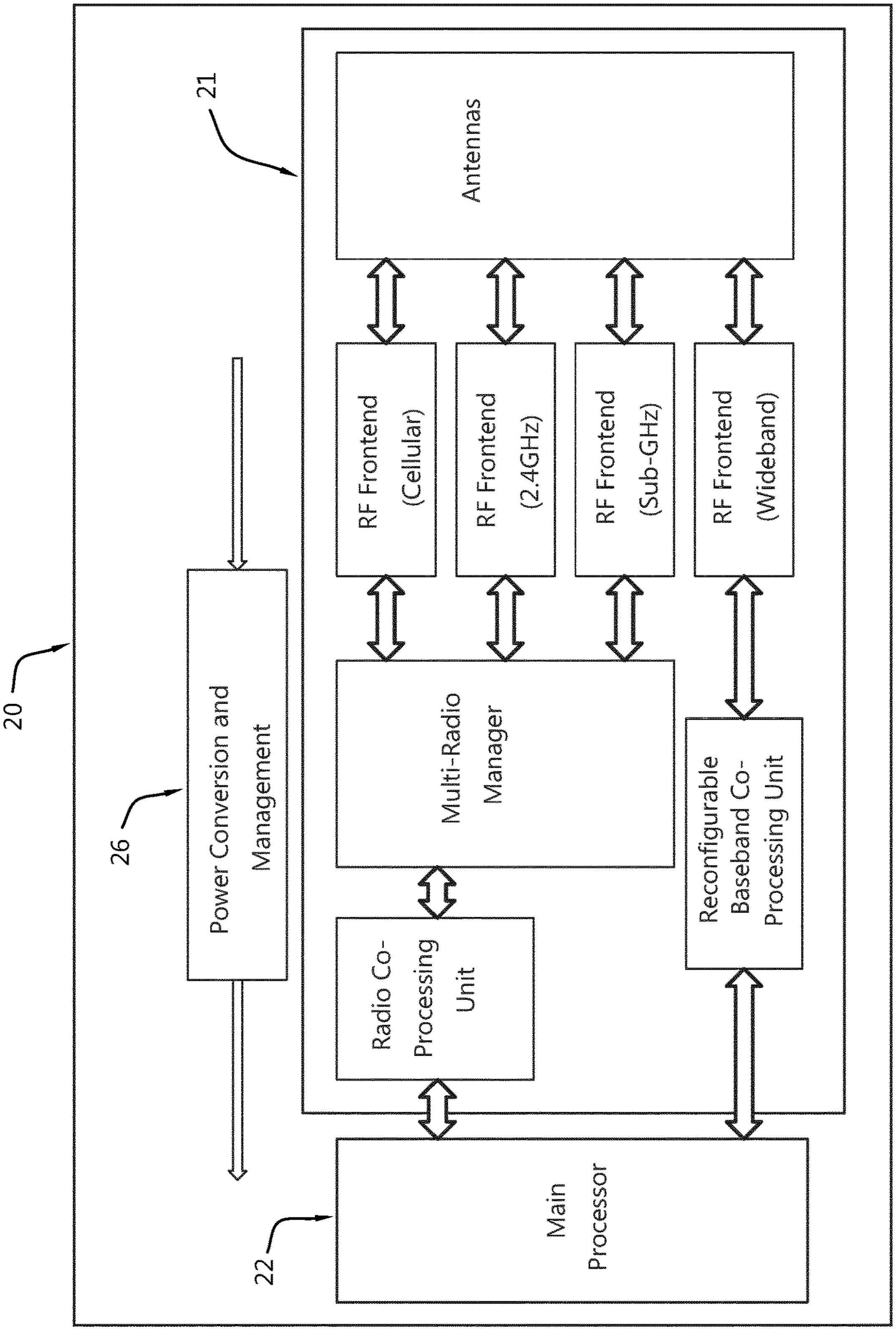
FIG. 5 illustrates an exemplary embodiment of a fog device.

FIG. 5 illustrates an exemplary embodiment of a fog device 20. A fog device 20 may comprise communication means 21, processing means 22, and power conversion and management module 26. The communication means 21 may comprise at least three RF front end modules communicating with at least two different edge devices 10 or 10' and the control central means 30. It is noted here that an edge device 10 or 10' may comprise communication means 11 including one RF (Radio Frequency) front end module capable of communicating the edge processed data to the fog device 20. The characteristics of the communication means 11 of an edge device may vary depending on the type of data sources arranged at the edge device 10 or 10'. For instance when the data source 13 connected to the common interface 18 is an optical camera, the processing means 12 may comprise a 2.4 GHz RF front end module, allowing sufficient bandwidth for classes and attributes derived from the edge processing of the camera feed. For other data sources 13 like a sound sensor, a Sub-GHz RF front end module in the communication means 11 may be sufficient for communication with the fog device 20. In contrast, a fog device 20 has more functionality than an edge device 10 or 10' which translates to higher bandwidth needs of the fog communication means 21. A cellular RF front end module may be provided to communicate with the central control means 30. A 2.4 GHz RF front end module may be provided to communicate with a first edge device 10, comprising for instance a camera. A Sub-GHz front end module may be provided to communicate with a second edge device 10', comprising for instance a sound sensor. Each of the above RF front end modules may then interconnect with a multi-radio manager for optimum spectrum management and timings, which in turn interconnects with a radio co-processing unit for protocol related tasks like encoding/decoding packet, etc. An additional wideband RF front end module may be provided to communicate with yet another edge devices 10 or 10' (not shown). The wideband RF Front end module may communicate with a reconfigurable baseband co-processing unit able to be reconfigured, in real time, for a particular type of edge device 10 or 10'. This allows an increased flexibility as any additional edge device having a communication frequency within the wideband range may then communicate with the processing means 22 of the fog device 20. Both the standard and the reconfigurable radio co-processing units may then be in communication with the main processor which forms the processing means 22 and does the actual processing of the received data. The main processor 22 may support an AI engine and/or a DNN engine. The main processor may have high performance, low power consumption, resiliency and versatility. The fog device 20 may further comprise a power conversion and management module 26 receiving AC power and providing DC power to the above-mentioned internal modules/units of the communication means 21 and the processing means 22, in an efficient manner.

It is further noted that an edge module and/or an edge device 10 may be implemented in a functional pole module for use in a modular lamp post as described in EP 3 076 073 B1 in the name of the applicant. EP 3 076 073 B1 discloses a modular lamp post which is readily assembled and installed in the field whilst providing rigidity, structural integrity and sealing. The lamp post comprises a plurality of pole modules mounted on a support pole. The pole modules are connected to one another by respective pole module connectors and one pole module thereof is connected to the support pole by a pole module connector. EP 3 076 073 B1 is included herein by reference.

Figure 6:
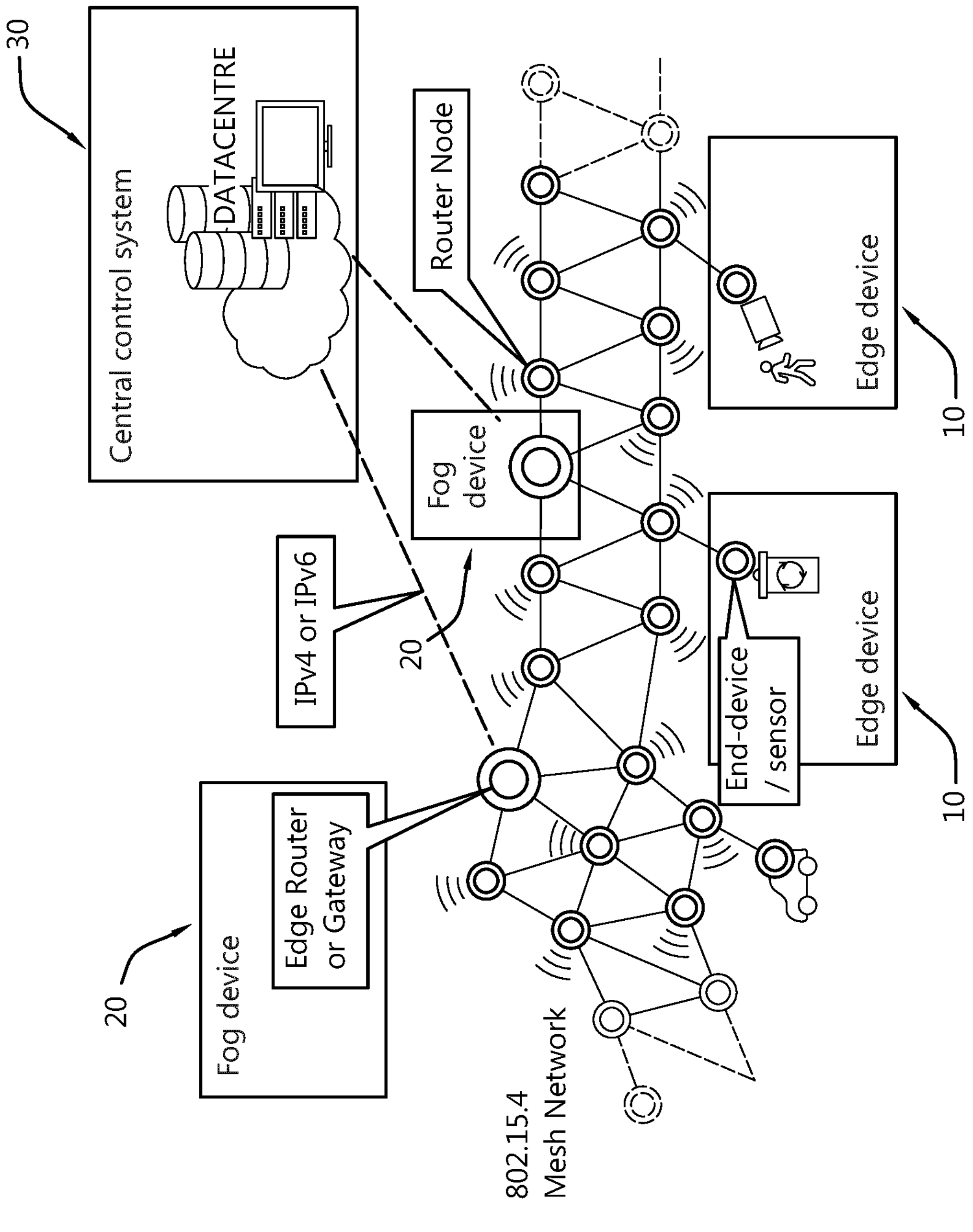
FIG. 6 illustrates a mesh network according to an exemplary embodiment.

FIG. 6 illustrates a mesh network according to an exemplary embodiment. A plurality of fog devices 20 may communicate between themselves, with a central control means 30, and a plurality of edge devices 10. Each edge device 10 or 10' may in turn communicate with one or more fog devices 20 and one or more edge devices 10 or 10', providing thus a mesh architecture, improving latency and reliability. The following types of bidirectional communications are thus possible: edge to edge, edge to fog, fog to fog, fog to cloud, cloud to cloud. Although not represented, there may be more than one central control means 30 provided for different users. For instance, there may be a first central control means owned by a city for treating smart-city data to improve the city life and a second central control means owned by the company in charge of the maintenance of the edge devices and/or fog devices. The second central control means may then be used for gathering maintenance data about the edge devices 10. In that case, the fog device 20 may have the additional capability of separating fog processed data depending on the user the data is meant for, such that data protection is insured.

Figure 7:
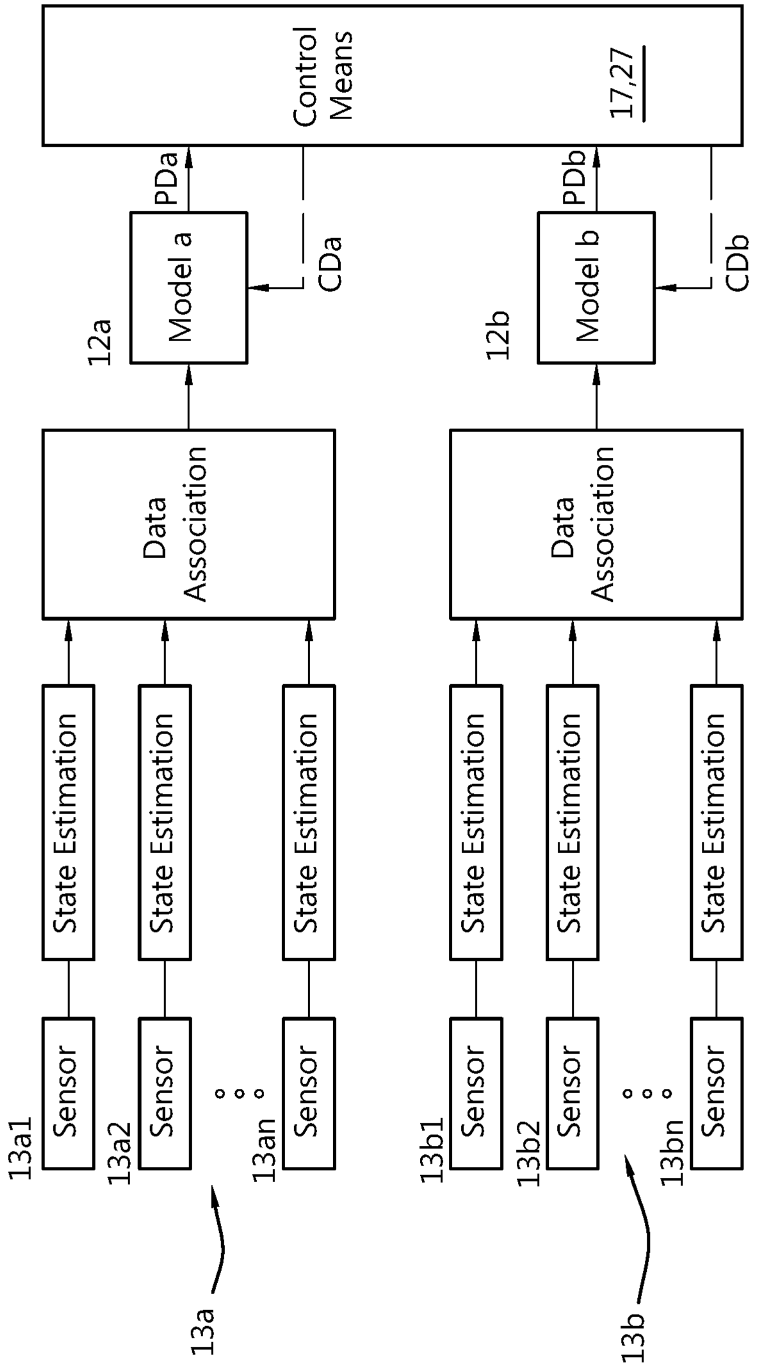
FIGS. 7, 8 and 9 illustrate alternative exemplary embodiments of classification at an edge device.
Figure 8:
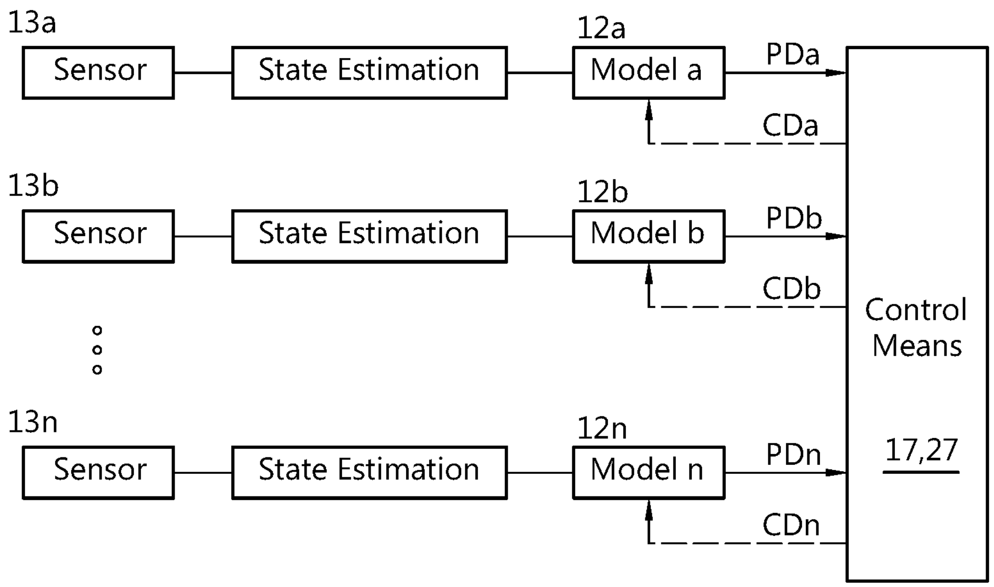
Figure 9:
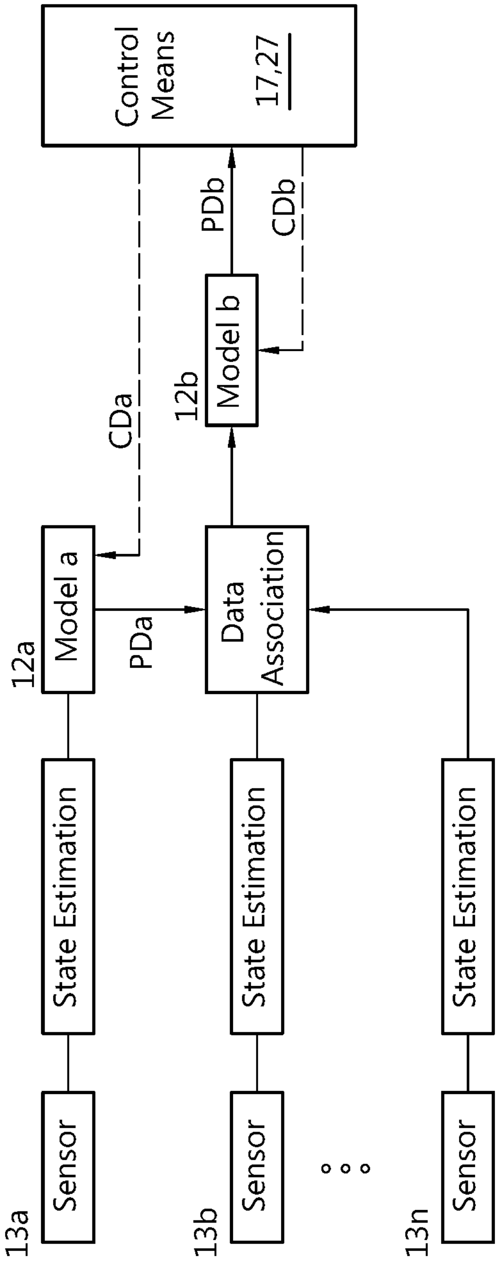

FIGS. 7, 8 and 9 illustrate alternative exemplary embodiments of classification at an edge device for self-learning systems using models. FIG. 7 illustrates a principle of data fusion where data from a plurality of data sources 13 is first combined by data association and later classified using a model. A plurality of data sources **13*a* may be arranged at the same edge device 10*a* (not represented) and each provide sensed data to the edge processing means 12*a* of that edge device 10*a*. Each sensed data may then first be separately state estimated to extract a feature related to an event. The plurality of results of the state estimation of each data source 13*a*** sensed data may then be combined by data association. By data association, similar features may be recognized, and different features may be weighted. Finally, classification of the result of the data association may be performed to obtain a classification of the event.

A first plurality of data sources **13*a* may be arranged at a first edge device 10*a* and may each provide sensed data to the edge processing means 12*a* of that edge device 10*a*. The first plurality of data sources 13*a* may comprise a first sensor 13*a*1 and a second sensor 13*a*2. A second plurality of data sources 13*b* may be arranged at a second edge device 10*b* (not represented) and each provide sensed data to the edge processing means 12*b* of that edge device 10*b*. The second plurality of data sources 13***b* may comprise a first sensor 13*b*1 and a second sensor 13*b*2. Alternatively, there may be a single second source 13*b* and/or the two groups of sensors 13*a* and 13*b* may be arranged on the same edge device.

Each sensed data may then first be separately state estimated to extract at least one feature related to an event. The plurality of results of the state estimation of each data source sensed data may then be grouped and combined by data association. By data association, similar features may be recognized, and different features may be weighted to obtain a vector of features with a potentially larger dimension than each of the original vectors of features obtained by state estimation. A first processing means 12*a* may then process the result of the data association of all the sensors 13*a* to select at least a first class an/or attribute according to a first model, Model a, while a second processing means 12*b* may process the result of the data association of all the sensors 13*b* to select at least a second class and/or attribute according to a second model, Model b. One model may be better than the other. Models may indeed be ranked depending on circumstances based on any one of the number of classes, the number of subclasses, the number of attributes, the accuracy of the attributes, a reliability index (derived from environment conditions and historical data), etc. For instance a camera sensor will perform much better during the day than during the night, and a noise sensor reporting very high levels for a couple of minutes because of construction work should be disregarded as it will not provide reliable information for car detection.

Control means 17 arranged in an edge device or control means 27 arranged in a fog device may then be configured to fuse the processed data from both models by decision fusion to obtain a final classification and/or attribute(s). If two classifications are the same, a single one may be selected, whereas if they are not the same, one classification may be decided by decision fusion. Control means 17 arranged in an edge device or control means 27 arranged in a fog device may then control one of the first and/or second processing means 12*a* and/or 12*b* to use the processed data obtained with the best model to train the processing means having a worse model. In particular the processed data obtained with the best model may be used to generate control data to change the other one or more models. In case of classification, the finest classification may be used to train the processing means which had provided a coarser classification. It is further noted that although classification has been mainly discussed above, the self-learning systems of the invention using models may also be envisaged for prediction. Based on the results of the decision fusion, the models may thus be updated with a new set of rules for new classes and/or subclasses and/or attributes. It is noted that decision fusion may use additional environmental data for decision if the results of different models are diverging.

In an exemplary embodiment, a system may comprise a first edge device 10*a* with a single sensor 13*a*1 and a second edge device 10*b* with three sensors 13*b*1, 13*b*2 and 13*b*3 (shown for n=3). In that example, the edge processing means 12*a* of the first edge device 10*a* may be configured to process the environmental data of its only sensor, in accordance with a first set of classification rules, according to Model a and providing fewer classes than a second set of classification rules, Model b, of the edge processing means 12*b* of the second edge device 10*b*. Fog control means 27 may then be able to fuse the two sets of classifications rules by decision fusion to obtain a final classification which may be better than the first and the second classification. Fog control means 27 may further be able control the first and second edge processing means 12*a* and 12*b* such that the second edge processed data PDb is used to train the first processing means 12*a*. In this way the first processing means 12*a* may learn the classification of the second processing means 12*b*, improving thus the first set of rules of the first processing means 12*a*. In other words Model a may be improved based on the results obtained with Model b, for instance control data CDa may be generated such that Model a may be updated with a new set of rules for new classes and/or subclasses and/or attributes.

FIG. 8 illustrates an alternative embodiment of classification according to another principle of data fusion where data from a plurality of data sources 13 is first independently classified using a model and later fused by decision fusion. In that case the separate results of state estimation of the plurality of sensed data from the plurality of data sources 13 are each independently classified using a model. The plurality of classifications obtained in this way are then combined by decision fusion to obtain a single classification of the event. For instance, if the classifications are the same, a single one may be selected, whereas if they are not the same, one classification is decided by decision fusion. Decision fusion may use additional environmental data for decision, e.g. time of day, humidity. It is further noted that a single classification may comprise multiple values for multiples classes, e.g. a value for a type of vehicle, a value for a color of a vehicle, a value for a brand of vehicle, etc.

It is noted that a fog device 20 receiving a plurality of classifications from a plurality of edge devices 10, may in turn apply the principle of decision fusion to obtain a single classification as fog processed data. This principle has been described previously in the application with respect to FIG. 2 in the case where two classes received by a fog device 20 would not be the same. In this way a more compact information may be communicated to the central control means 30.

A first processing means 12*a* may for instance process the result of the state estimation of a first sensor 13*a* to select a first classification and/or first attribute according to a first model, Model a, while a second processing means 12*b* may process the result of the state estimation of a second sensor 13*b* to select a second classification and/or second attribute according to a second model, Model b. One model may be better than the other. Models may indeed be ranked depending on circumstances based on any one of the number of classes, the number of subclasses, the number of attributes, the accuracy of the attributes, etc. Control means 17 at edge level or control means 27 at fog level may then be configured to fuse the processed data from both models by decision fusion to obtain a final classification and/or attribute(s). If classifications of two models are the same, a single one may be selected, whereas if they are not the same, one classification may be decided by decision fusion. It is noted that decision fusion may use additional environmental data for decision if the results of different models are diverging. Finally, the processed data obtained by decision fusion may be used to generate control data to change one or more models. In case of classification the finally obtained classification may be used to train the processing means which had provided a different classification. It is further noted that although classification has been mainly discussed above, the self-learning systems of the invention using models may also be envisaged for prediction.

The system of FIG. 8 may be applied in a system comprising for instance two sensors 13*a* and 13*b* arranged on the same edge device. The environmental data from each sensor 13*a* and 13*b* may be processed independently by a dedicated first processing means 12*a* and 12*b*. A first processing means 12*a* may process the environmental data from sensor 13*a* to select a first classification and/or a first attribute, according to a first model, Model a, while a second processing means 12*b* may process the environmental data from sensor 13*b* to a select a second classification and/or second attribute, according to a second model, Model b, where the second model is better than the first model (finer classification with more classes for instance). Control means 17 arranged in the edge device or control means 27 arranged in the fog device may fuse the results from the two models by decision fusion to keep the best results. Based on the results of the decision fusion, control data CDa and/or CDb may be generated by the control means 17 or 27 such that Model a and/or Model b may be updated with a new set of rules for new classes and/or subclasses and/or attributes. It is noted that decision fusion may use additional environmental data for decision, e.g. time of day, humidity. It is further noted that a single classification may comprise multiple values for multiples classes, e.g. a value for a type of vehicle, a value for a color of a vehicle, a value for a brand of vehicle, etc.

It is noted that a fog device 20 receiving a plurality of classifications from a plurality of edge devices 10, may in turn apply the principle of decision fusion to obtain a single classification as fog processed data. The invention will for example be described in a system comprising a first edge processing means 12*a* generating a first processed data PDa according to a first of rules, Model a, and a second edge processing means 12*b* generating a second processed data PDb according to a second set of rules, Model b, made on a larger set of classes, due for instance to decision fusion as described with reference to FIG. 8. In that example, the fog processing means 22 may be configured to fuse the results from the two models by decision fusion to keep the best results as fog processed data. Further fog control means 27 may yet be able to control the first and second edge processing means 12*a* and 12*b* such that the second edge processed data PDb is used to train the first edge processing means 12*a* to improve its classification, e.g. Model a, providing for instance control data CDa for an updated model a.

FIG. 9 illustrates another alternative embodiment of classification according to data fusion where classification using a model may be done in cascade using the results of a previous classification using another model. In that case the result of state estimation of some sensors may be associated to the results of classification of at least one sensor, to be finally classified. A first sensor 13*a* may be configured to obtain environmental data which is processed by a first processing means 12*a* according to a first model, Model a, defined by a first set of rules to generate first processed data PDa. The first processed data PDa of the processing means 12*a* may then be combined to the environmental data of a second sensor 13*b*. A second processing means 12*b* may then be configured to process the first processed data PDa combined with the environmental of the second sensor 13*b*, to generate second processed data PDb according to a second model, Model b, defined by a second set of rules. Control means 17 in the edge device or 27 in a fog device may then further also be able to control the first processing means 12*a* such that the second processed data PDb is used to train the first processing means 12*a* providing for instance control data CDa for an updated model a. Similarly control means 17 in the edge device or 27 in a fog device may also be able to control the first processing means 12*b* such that the second processed data PDb is used to train the second processing means 12*b*, providing for instance control data CDb for an updated model b. Based on the results of the final classification, the models a and/or b may be updated with a new set of rules for new classes and/or subclasses and/or attributes.

Whilst the principles of the invention have been set out above in connection with specific embodiments, it is understood that this description is merely made by way of example and not as a limitation of the scope of protection which is determined by the appended claims.

The invention claimed is:

1. A network system comprising:

a plurality of edge devices arranged at a plurality of locations, an edge device thereof comprising:

at least one data source configured to obtain environmental data, said environmental data being related to an event in the edge device or the vicinity of the edge device, an edge processing means configured to produce edge processed data based on said environmental data, said edge processed data comprising at least one value representative for a class selected from a plurality of predetermined classes for classifying the event, and an edge communication means for communicating edge processed data;

a plurality of fog devices, a fog device thereof being associated with a subset of said plurality of edge devices, said fog device comprising:

a fog communication means configured to receive edge processed data from said subset and to transmit fog processed data, and a fog processing means configured to process the edge processed data received from said subset and to produce fog processed data based thereon, said fog processed data comprising information about an event in the vicinity of said subset or an event in at least one edge device of said subset; and a central control system in communication with said plurality of fog devices and configured to receive fog processed data from said plurality of fog devices;

wherein the at least one data source comprises at least a first sensor configured to obtain first sensed environmental data and a second sensor configured to obtain second sensed environmental data for the same event, and wherein the edge processing means is configured to select a class for the event based on at least the first and the second sensed environmental data.

2. The system of claim 1, wherein the fog communication means is configured to receive first edge processed data about an event from a first edge device and to receive second edge processed data about an event from a second edge device, and wherein the fog processing means is configured to process said first and second edge processed data to determine whether or not the first and second edge processed data relate to the same event, and to transmit fog processed data to the central control system in accordance with the determined result.

3. The system of claim 1, wherein the edge processed data comprises at least one value representative for an attribute associated to the event, said attribute characterizing a property of the event.

4. The system of claim 1, wherein the event comprises one of an event related to an object in the edge device or the vicinity of the edge device, an event related to a state of an object in the edge device or the vicinity of the edge device, an event related to an area in the vicinity of the edge device, an event related to a state of a component of the edge device.

5. The system of claim 1, wherein the edge processed data comprises at least one value representative for an attribute associated to the event, said attribute characterizing a property of the event, wherein the at least one value for an attribute associated to the event is based on the first and/or the second sensed environmental data.

6. The system of claim 1, wherein the fog processing means is configured to use data from a database to process the edge processed data received from said subset; and/or wherein the edge processing means is configured to use data from a database to process the obtained environmental data.

7. The system of claim 1, wherein, when the first class is different from the second class, the fog processing means is configured to use data from a database to determine whether to attribute the first or second class to the event, and to generate processed fog data including the determined class for the event.

8. The system of claim 6, wherein the fog processing means is configured to augment the fog processed data using data from the database; and/or wherein the data in the database includes any one or more of the following: weather related information, traffic information, geo-coordinates, news and internet information, public transportation information, events schedules, timing information, public safety information, sanitary reports, security reports, road condition reports and cellphone data of cellphones.

9. The system of claim 1, wherein each fog device is configured to take decisions on the processing and transmitting of data, said decisions including one or more of the following:

whether or not received edge processed data is to be processed by the fog device or to be transmitted to the central control system;

whether or not fog processed data is to be transmitted to the central control system.

10. The system of claim 1, wherein the at least one data source comprises at least one sensor; and/or wherein said at least one data source comprises at least two sensors connected to a common interface board of the edge device.

11. The system of claim 1, wherein the at least one data source comprises at least one of: an optical sensor, a photodetector, an image sensor, a sound sensor, a radar, a Doppler effect radar, a LIDAR, a humidity sensor, a pollution sensor, a temperature sensor, a motion sensor, an antenna, an RF sensor, a vibration sensor, a metering device, a malfunctioning sensor, a measurement device for measuring a maintenance related parameter of a component of the edge device, an alarm device; and/or wherein the at least one data source comprises an image sensor configured to sense raw image data of the event, wherein the edge processing means is configured to process the sensed raw image data to select a class from a plurality of classes relating to the type of object involved in the event, to generate an image attribute associated with the event, and to include the selected class and said image attribute in the edge processed data; and/or wherein the at least one data source comprises a sound sensor configured to sense sound data of the event, wherein the edge processing means is configured to select a class from a plurality of classes according to the type of object involved in the event, and to include the selected class in the edge processed data; and/or wherein the at least one data source comprises a radar sensor configured to sense radar data, wherein the edge processing means is configured to process the sensed radar image data to select a class from a plurality of classes relating to the type of object involved in the event, to generate a speed attribute associated with said object, and to include the selected class and said speed attribute in the edge processed data.

12. The system of claim 1, wherein each fog device and associated subset of edge devices are arranged in a mesh network; and/or wherein the edge device is configured to control the at least one data source and the edge processing means using a machine learning model; and/or wherein the fog device is configured to control the fog processing means using a machine learning model.

13. The system of claim 1, wherein the edge device is configured to control the edge processing means to update the predetermined classes for classifying; and/or wherein the fog device is configured to control the edge processing means to update the predetermined classes for classifying.

14. The system of claim 1, wherein each subset of edge devices comprises at least ten edge devices.

15. The system of claim 1, wherein the plurality of edge devices comprises any one or more of the following: a luminaire, a bin, a sensor device, a street furniture, a charging station, a payment terminal, a parking terminal, a street sign, a traffic light, a telecommunication cabinet, a traffic surveillance terminal, a safety surveillance terminal, a water management terminal, a weather station, an energy metering terminal, an access lid in a pavement.

16. The system of claim 1, wherein the fog device is configured to transmit control data based on fog processed data to an edge device of the plurality of edge devices, and wherein the edge device comprises a controller configured to control a component thereof in function of the received control data; and/or wherein the fog processing means comprises at least three RF front end modules to communicate with at least two edge devices and the central control means.

17. An edge module for use in a system according to claim 1, comprising at least two sensors and further comprising a common interface board for interconnecting said at least two sensors to the edge processing means of an edge device, wherein the common interface board comprises signal level translation means for translating data signal levels between the at least two sensors and the edge processing means and/or power conversion and management means for receiving power from a power source and converting said power for powering the at least two sensors.

18. A network system comprising:

a plurality of edge devices arranged at a plurality of locations, an edge device thereof comprising:

at least one data source configured to obtain environmental data, said environmental data being related to an event in the edge device or the vicinity of the edge device, an edge processing means configured to produce edge processed data based on said environmental data, said edge processed data comprising at least one value representative for a class selected from a plurality of predetermined classes for classifying the event, and an edge communication means for communicating edge processed data;

a plurality of fog devices, a fog device thereof being associated with a subset of said plurality of edge devices, said fog device comprising:

a fog communication means configured to receive edge processed data from said subset and to transmit fog processed data, and a fog processing means configured to process the edge processed data received from said subset and to produce fog processed data based thereon, said fog processed data comprising information about an event in the vicinity of said subset or an event in at least one edge device of said subset; and a central control system in communication with said plurality of fog devices and configured to receive fog processed data from said plurality of fog devices;

wherein the at least one data source comprises at least a first sensor configured to obtain first sensed environmental data and a second sensor configured to obtain second sensed environmental data, and wherein the edge processing means is configured to select a first class for the event based on the first sensed environmental data and to select a second class for the same event based on the second sensed environmental data, wherein preferably the edge processing means is configured to use the first class to select the second class.

19. The network system according to claim 18, wherein the edge processing means is configured to control the communication means to transmit:

a single value if the selected first and second classes are the same, or first and second values representative for the selected first and second classes if the first and second classes are not the same.

* * * * *